(12) United States Patent
Bettella

(10) Patent No.: US 11,084,414 B2
(45) Date of Patent: Aug. 10, 2021

(54) SELF-PROPELLED MODULE FOR OVERSIZE LOADS

(71) Applicant: Massimo Bettella, Padua (IT)

(72) Inventor: Massimo Bettella, Padua (IT)

( * ) Notice: Subject to any disclaimer, the term of this patent is extended or adjusted under 35 U.S.C. 154(b) by 277 days.

(21) Appl. No.: 16/304,629

(22) PCT Filed: May 30, 2017

(86) PCT No.: PCT/EP2017/063052
§ 371 (c)(1),
(2) Date: Nov. 26, 2018

(87) PCT Pub. No.: WO2017/207578
PCT Pub. Date: Dec. 7, 2017

(65) Prior Publication Data
US 2019/0291631 A1  Sep. 26, 2019

(30) Foreign Application Priority Data

May 31, 2016  (IT) ......................... 102016000055947

(51) Int. Cl.
*B60P 3/40* (2006.01)
*B62D 21/03* (2006.01)
(Continued)

(52) U.S. Cl.
CPC ................ *B60P 3/40* (2013.01); *B26D 1/245* (2013.01); *B32B 37/12* (2013.01); *B32B 38/145* (2013.01);
(Continued)

(58) Field of Classification Search
CPC ....... B32B 38/145; B32B 37/12; B32B 39/00; B32B 37/1284; B32B 2037/1253;
(Continued)

(56) References Cited

U.S. PATENT DOCUMENTS 4,029,165 A * 6/1977 Miller ................... B62D 11/20
180/6.48
4,611,817 A 9/1986 Dewing et al.
(Continued)

OTHER PUBLICATIONS

International Search Report dated Aug. 23, 2017 re: Application No. PCT/EP2017/063052, pp. 1-3, cting: U.S. Pat No. 5,379,842 A, U.S. Pat. No. 6,050,355 A, US 2005/0061560 A1 and U.S. Pat No. 4,611,817 A.
(Continued)

*Primary Examiner* — Anne Marie M Boehler
*Assistant Examiner* — Felicia L. Brittman
(74) *Attorney, Agent, or Firm* — Cantor Colburn LLP

(57) ABSTRACT

A self-propelled module for oversize loads includes two ground movement assemblies with oil-pressure controlled actuation; a transverse rocker arranged between the movement assemblies, which are coupled thereto independently; oil-pressure controlled suspension elements, arranged on corresponding oscillating supports coupled to the transverse rocker; and a load-bearing frame, supported by the oil-pressure controlled suspension elements. The load-bearing frame includes an oil-pressure controlled circuit adapted to serve the ground movement assemblies and the suspension means elements. The module further includes a rotary distribution unit, having a vertical axis, mounted on the load-bearing frame for supplying the ground movement assemblies and the oil-pressure controlled suspension elements, a first part of the rotary distribution unit being fixed to the load-bearing frame, and a second part being free to rotate about the vertical of the resting surface with respect to the load-bearing frame.

16 Claims, 6 Drawing Sheets

(51) Int. Cl.
| | |
|---|---|
| *B62D 55/14* | (2006.01) |
| *B62D 55/20* | (2006.01) |
| *B62D 55/26* | (2006.01) |
| *B60P 1/00* | (2006.01) |
| *B60G 17/04* | (2006.01) |
| *B60K 7/00* | (2006.01) |
| *B32B 38/00* | (2006.01) |
| *B32B 37/12* | (2006.01) |
| *B32B 39/00* | (2006.01) |
| *B41F 19/00* | (2006.01) |
| *B26D 1/24* | (2006.01) |
| *B65H 35/08* | (2006.01) |
| *B41F 5/24* | (2006.01) |
| *B65H 35/02* | (2006.01) |
| *G05D 1/02* | (2020.01) |
| *B32B 37/20* | (2006.01) |

(52) U.S. Cl.
CPC ............. *B32B 39/00* (2013.01); *B41F 5/24* (2013.01); *B41F 19/004* (2013.01); *B60G 17/04* (2013.01); *B60K 7/0015* (2013.01); *B60P 1/00* (2013.01); *B62D 21/03* (2013.01); *B62D 55/14* (2013.01); *B62D 55/20* (2013.01); *B62D 55/26* (2013.01); *B65H 35/02* (2013.01); *B65H 35/08* (2013.01); *B32B 37/1284* (2013.01); *B32B 37/203* (2013.01); *B32B 2037/1253* (2013.01); *B32B 2310/0887* (2013.01); *B32B 2439/70* (2013.01); *G05D 1/021* (2013.01)

(58) Field of Classification Search
CPC .............. B32B 37/203; B32B 2439/70; B32B 2310/0887; B41F 19/004; B41F 5/24; B26D 1/245; B65H 35/08; B65H 35/02; B60G 17/04; B60G 17/005; B60G 17/018; B60G 2400/60; B60G 2400/51; B60G 2204/418; B60G 2204/46; B60K 7/0015; B62D 21/03; B62D 55/14; B62D 55/20; B62D 55/26; G05D 1/021; B60Y 2200/147; B60P 3/40; B60P 1/00
USPC .................................... 180/9.1, 7.1
See application file for complete search history.

(56) References Cited

U.S. PATENT DOCUMENTS

| | | | |
|---|---|---|---|
| 5,379,842 A | 1/1995 | Terry | |
| 6,050,355 A | 4/2000 | Beck, Jr. | |
| 7,950,478 B2* | 5/2011 | Terry | B62D 7/1509 |
| | | | 180/9.46 |
| 9,702,096 B2* | 7/2017 | Fritz | E01C 19/4893 |
| 2005/0061560 A1 | 3/2005 | Philipson | |
| 2008/0111327 A1* | 5/2008 | Rhodes | E04G 21/161 |
| | | | 280/5.514 |
| 2010/0236844 A1* | 9/2010 | Howe | B62D 55/253 |
| | | | 180/9.62 |

OTHER PUBLICATIONS

Written Opinion dated Aug. 23, 2017 re: Application No. PCT/EP2017/063052, pp. 1-5, cting: U.S. Pat No. 5,379,842 A, U.S. Pat. No. 6,050,355 A, US 2005/0061560 A1 and U.S. Pat. No. 4,611,817 A.

* cited by examiner

SELF-PROPELLED MODULE FOR OVERSIZE LOADS

TECHNICAL FIELD

The present disclosure relates to a self-propelled module for oversize loads.

BACKGROUND

Oversize loads are defined as such because they allow the transport of manufactured items and vehicles that are impossible to divide and therefore must be in any case transported in their entirety, having dimensions, weight and heights that exceed the maximum values set by the Traffic Code.

Among these elements or manufactured items there are also prefabricated structures for buildings, boats, boilers, excavators, agricultural machines, stone blocks, portions of transoceanic pipelines, and the like.

Several mutually very different vehicles are currently known for performing these transports.

A first type of conventional vehicle comprises transport carriages, with three or four ground resting points, which are wheeled not motorized or are motorized and radio controlled, both with wheels and with tracks.

These carriages have relatively modest dimensions and are very low, i.e., they rise above the ground by a few centimeters: owing to this particularity, these carriages are ill-suited for transports above a certain weight in tons due to the reduced number of points and regions in contact with the ground by means of which the weight can be discharged to the ground.

A second type of conventional vehicles is constituted by wheeled steerable industrial trailers towed by a tractor.

Although these steerable trailers are capable of bearing loads weighing tens of tons, they have a relatively low number of wheels, i.e., of ground resting points, on which the load stresses are concentrated, to the full disadvantage of the uniform distribution of the load on the entire structure; furthermore, since they have no engine, they must indeed be towed, with all the maneuvering problems which, despite being steerable, may arise from this.

These trailers further have the load resting surface at more than one meter from the ground, with all the disadvantages of balance and stability for the load that can occur.

A third type of conventional vehicles is constituted by monolithic motorized steerable wheeled vehicles with a person on board (such as a truck), or monolithic radio-controlled wheeled vehicles (such as platform) without a person on board.

These motorized vehicles, in addition to having a resting surface that is very high with respect to the ground, have maneuvering problems, since they can be driven like a truck, with similar problems if the route includes a relatively tight curve or a U-turn.

A fourth type of conventional vehicles is constituted by motorized multi-axle and therefore wheeled modular systems, which are also particularly high and difficult to maneuver in relatively confined spaces.

Systems are also known which comprise a plurality of tracked modules, which are controlled in a coordinated and synchronized manner by a single central control unit.

By virtue of the tracks, these tracked systems solve only partly the problem of the reduced ground resting regions that is typical of wheeled transport, since even each track comprises a limited number of points for discharging the weight to the ground, i.e., the points where the track is interposed between a meshing wheel or a guiding pulley and the ground.

Furthermore, these tracked module systems are ill-suited to keep the transported body resting on an overall resting surface that is stable, since any minimal hollow causes a difference in height between the resting surface of one module with respect to the resting surfaces of the other modules, with consequent unwanted stresses imposed on the body being transported and overall imbalances of the distributed masses.

SUMMARY

The aim of the present disclosure is to provide a self-propelled module for oversize loads that is capable of obviating the cited drawbacks of means of transport and modular systems of the known type.

Within this aim, the disclosure provides a compact self-propelled module the resting surface of which is low, i.e., close to the ground, and at the same time capable of supporting and moving tens of tons of load.

The present disclosure also provides a self-propelled module that is capable of better distributing on the ground the weight that it supports with respect to vehicles of the known type.

The present disclosure further provides a self-propelled module that is capable of a better steering angle than vehicles and modular systems of the known type.

The present disclosure further provides a self-propelled module which can be composed together with other identical modules so as to form a transportation system that can be adapted to the most disparate requirements of transport, both in terms of weights and in terms of dimensions of the bodies to be transported.

This aim, as well as these and other advantages which will become better apparent hereinafter, are achieved by providing a self-propelled module for oversize loads according to claim 1.

BRIEF DESCRIPTION OF THE DRAWINGS

Further characteristics and advantages of the disclosure will become better apparent from the description of a preferred but not exclusive embodiment of the self-propelled module according to the disclosure, illustrated by way of nonlimiting example in the accompanying drawings, wherein.

DETAILED DESCRIPTION OF THE DRAWINGS

Figure 1:
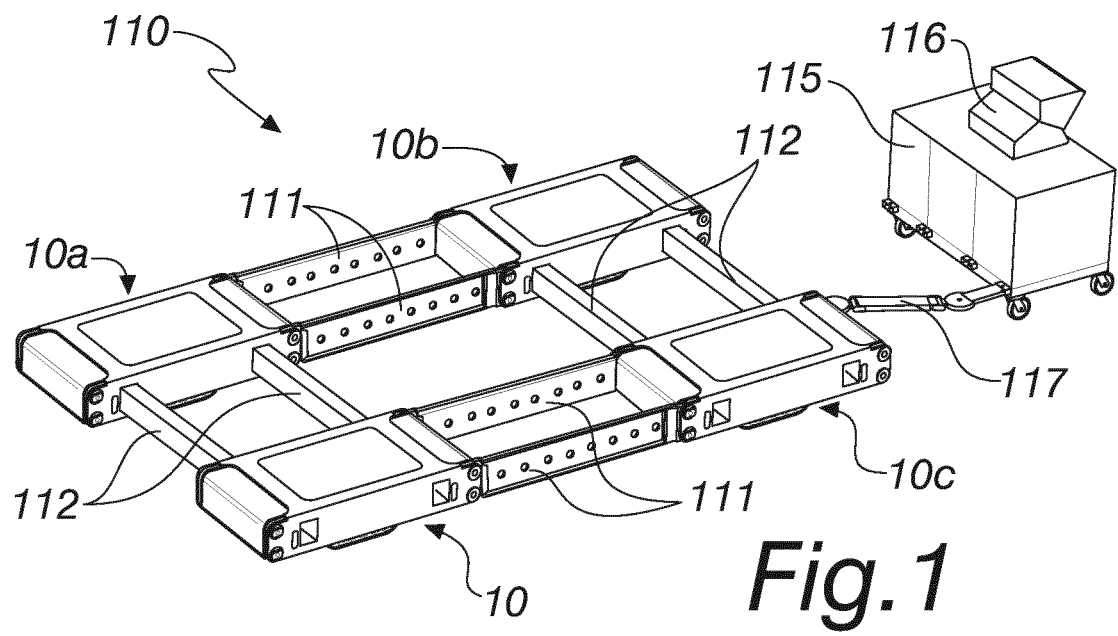
FIG. 1 is a view of a transportation system composed of a plurality of self-propelled modules according to the disclosure.
Figure 2:
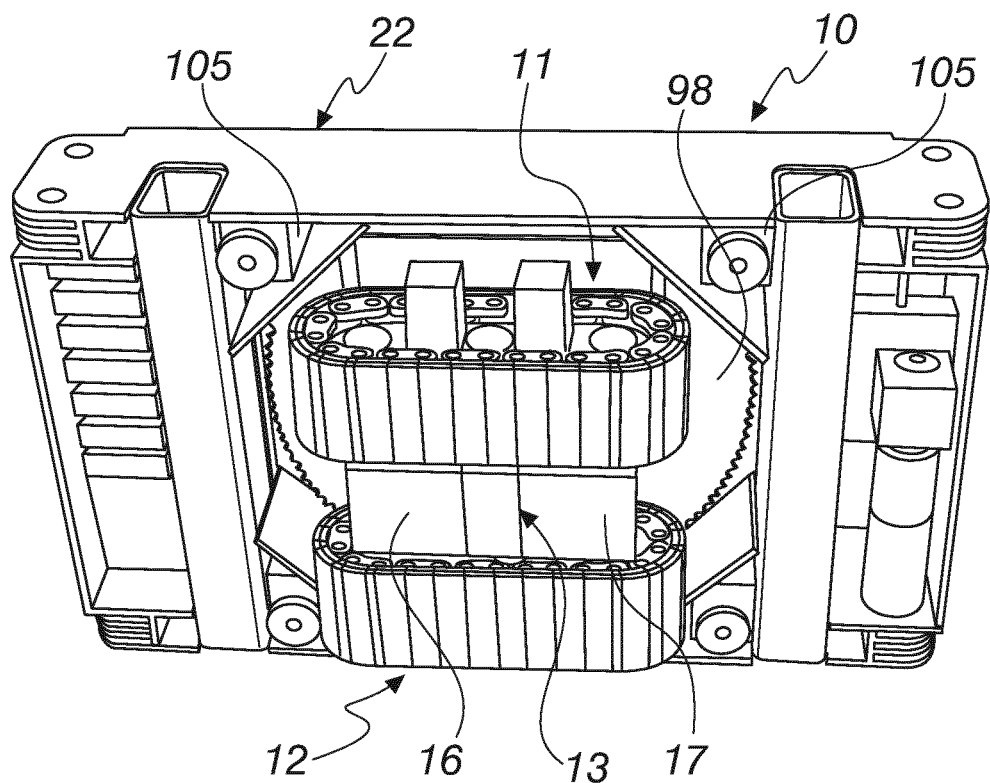
FIG. 2 is a perspective view from below of a self-propelled module according to the disclosure.

With reference to FIGS. 1-11, a self-propelled module for oversize loads according to the disclosure is designated generally by the reference numeral 10.

Figure 3:
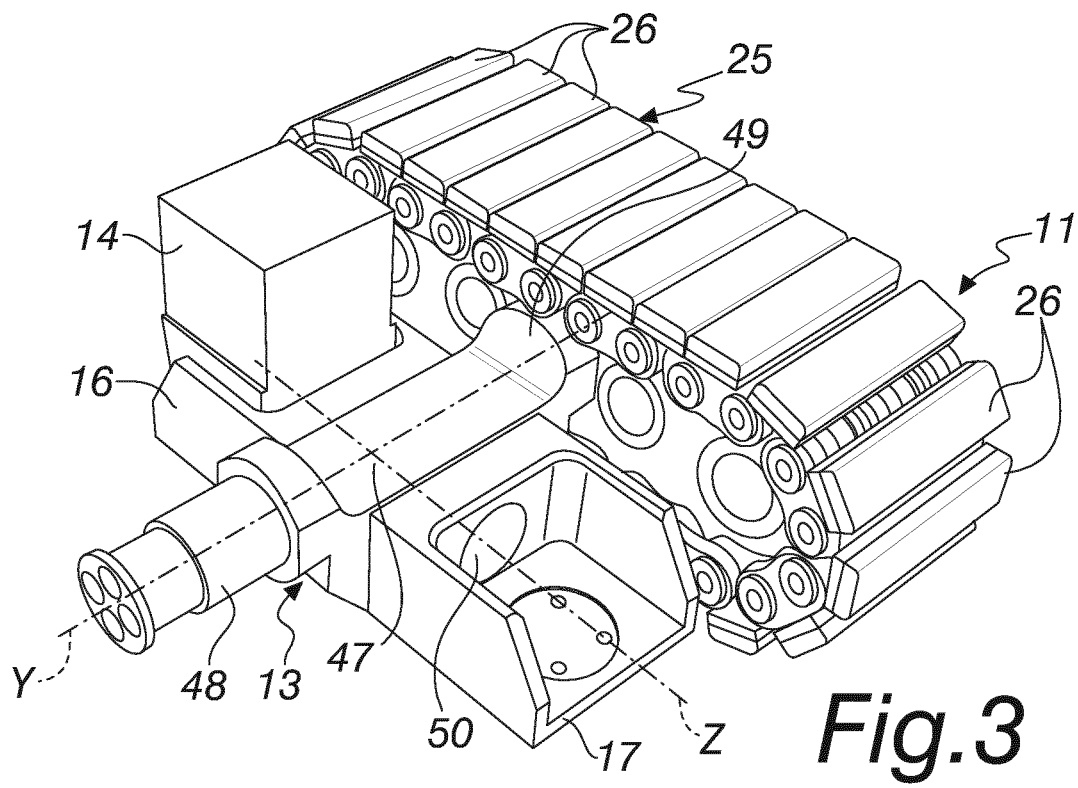
FIG. 3 is a perspective view of a part of the self-propelled module according to the disclosure.

The self-propelled module 10 comprises:
two ground movement assemblies 11 and 12 with oil-pressure controlled actuation,
a transverse rocker 13, clearly visible in FIG. 3, which is arranged between the movement assemblies 11 and 12, which are coupled thereto independently,
oil-pressure controlled suspension means 14 and 15, which are arranged on corresponding oscillating supports 16, 17, which are coupled to the transverse rocker 13,
a load-bearing frame 18, supported by said oil-pressure controlled suspension means 14 and 15, comprising an oil-pressure controlled circuit adapted to serve the ground movement assemblies 11, 12 and the suspension means 14, 15,
a rotary distribution unit 19, having a vertical axis X, mounted on the load-bearing frame 18, for supplying the ground movement assemblies 11 and 12 and the oil-pressure controlled suspension means 14 and 15; a first part 20 of the rotary distribution unit 19 is fixed to the load-bearing frame 18, while a second part 21 is free to rotate about the vertical axis X with respect to the first part 20,
a resting bed 22, which is supported by a center bearing 23 that is coaxial to the rotary distribution unit 19,
below the resting bed 22 there are means 24 for the relative rotation, with respect to the vertical axis X, of the resting surface 22 with respect to the load-bearing frame 18.

Figure 4:
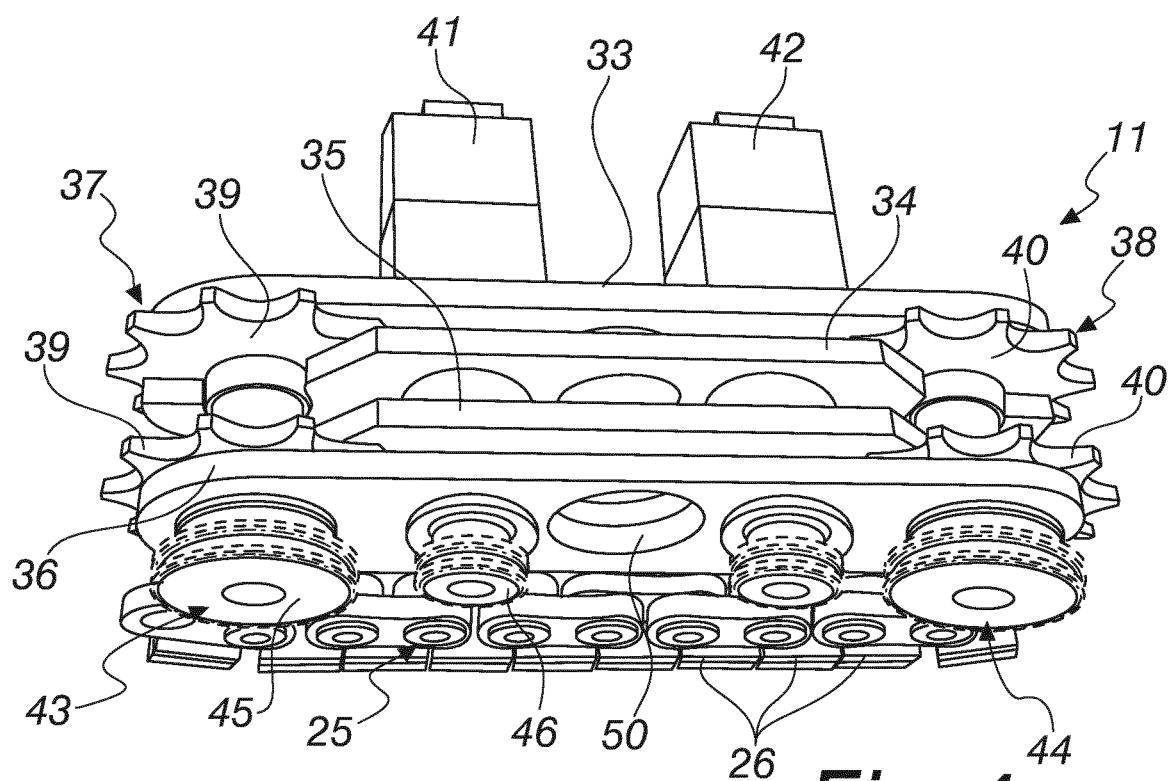
FIG. 4 is a perspective view of a ground movement assembly of the self-propelled module according to the disclosure.
Figure 5:
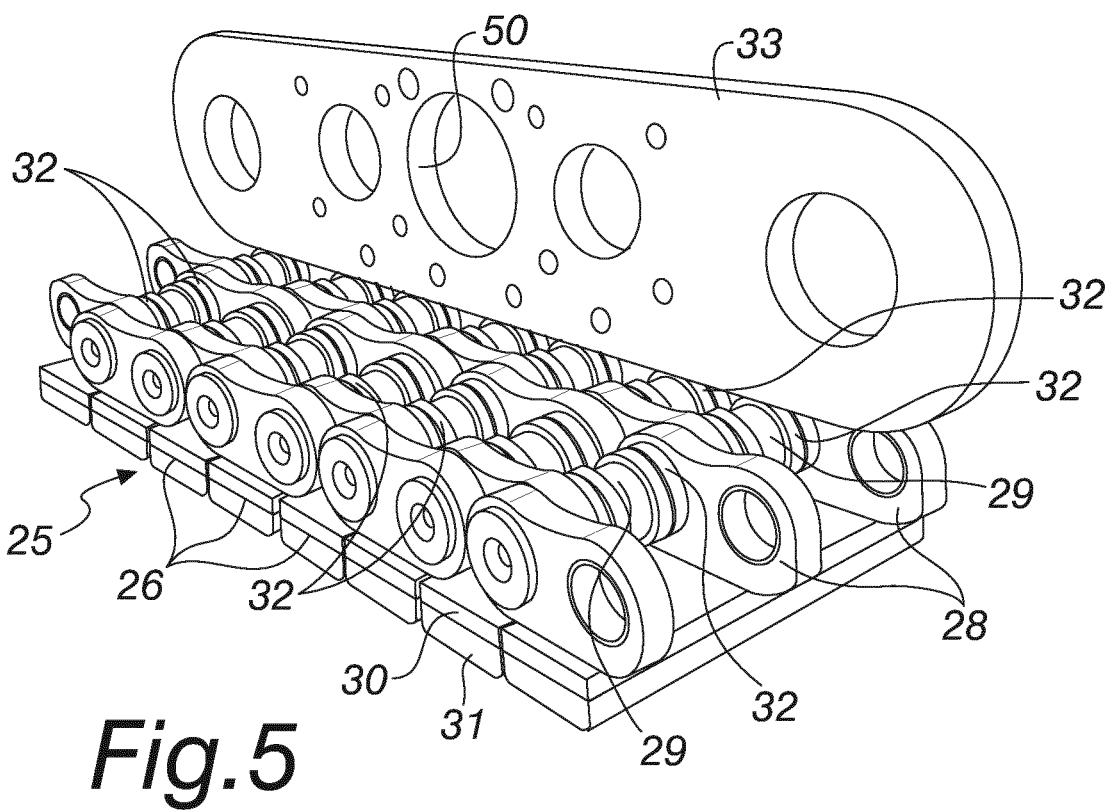
FIG. 5 is a perspective view of a detail of a ground movement assembly of the self-propelled module according to the disclosure.
Figure 6:
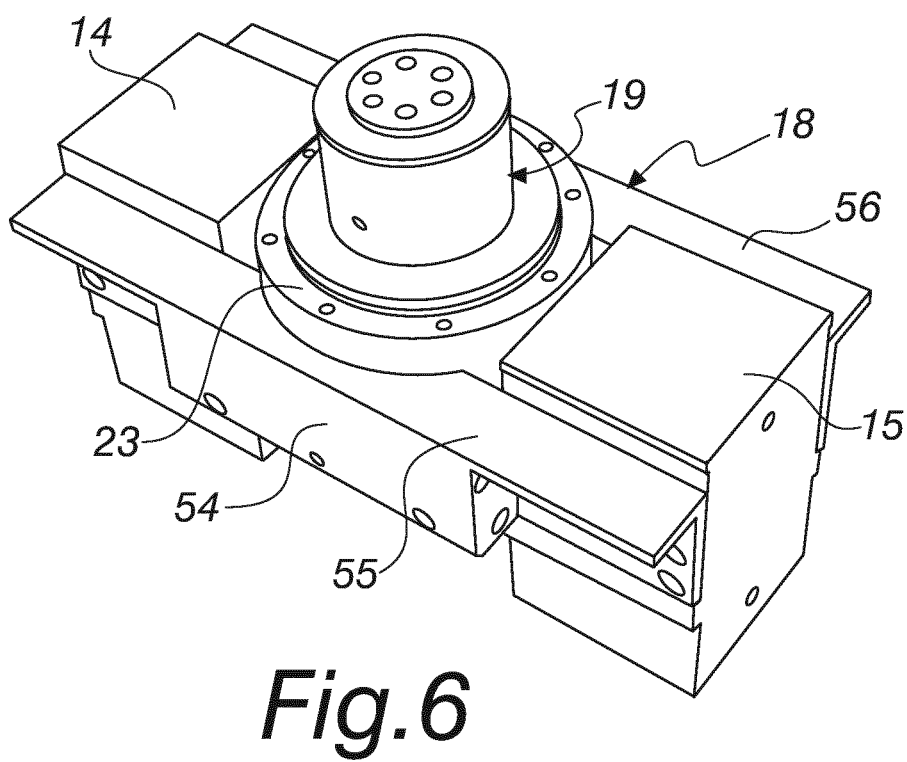
FIG. 6 is a view of the oil-pressure controlled suspension means of the self-propelled module according to the disclosure.

The two ground movement assemblies 11 and 12 are each constituted by a tracked shoe, one of which, the movement assembly 11, is clearly visible in FIGS. 3, 4, 5, the other movement assembly 12 being understood to be identical and symmetrical.

The movement assembly 11, as well as 12, comprises a track 25 that is constituted by a chain of flat elements 26 for resting on the ground, which are arranged side by side and are mutually coupled by means of perforated longitudinal brackets 28 and respective transverse pivots 29.

Each flat element 26 comprises an innermost structural base 30, for example made of a metallic material such as steel and the like, and a resting covering 31, for example made of polymeric material, which is adapted to protect from damage the paving over which it travels.

One or more friction reduction devices are fitted on the pivots 29, for example roller bearings 32 adapted to receive by resting one or more gliding plates, for example four gliding plates 33, 34, 35 and 36, as in FIGS. 4 and 5.

These gliding plates 33, 34, 35 and 36 are thus arranged so that each one slides on a row of roller bearings 32.

The track 25 is moved by two opposite pinions 37 and 38, which are visible in FIG. 4 and each of which is constituted, in the present exemplary embodiment, by two pairs of laterally mutually adjacent sprockets 39 and 40, which are adapted to mesh with the pivots 29.

The pinions 37 and 38 in turn are actuated by corresponding oil-pressure controlled motors 41 and 42, which are mounted on a gliding plate, for example on the external gliding plate 33.

The motion is transmitted to the pinions 37 and 38 by means of corresponding transmission devices 43 and 44, for example for example of the type with sprockets 45 and 46, by means of a chain or train of gears or other similar and equivalent devices.

The transverse rocker 13, which is clearly visible in FIG. 3, comprises a central body 47, from which two opposite hubs 48 and 49 protrude which are intended for insertion in corresponding central coaxial holes 50 of the gliding plates 33, 34, 35 and 36; the two movement assemblies 11 and 12 can therefore oscillate freely independently about the axis Y of the hubs 48 and 49.

The track 25 is closed so as to surround the gliding plates 33, 34, 35 and 36, and therefore each movement assembly 12 and 13 is rigid and cannot adapt to the underlying ground, compensating with rockers or rollers along the side that rests on the ground; these movement assemblies 12 and 13 are therefore particularly suitable for compact industrial paving, tarmac or concrete roads and less suitable for excessively uneven dirt roads or terrains.

The rocker 13 acts as an articulation point in order to allow the load to be always equally divided between the two movement assemblies 11 and 12.

The oil-pressure controlled suspension means 14 and 15 are constituted by two oil-pressure controlled cylinders, indeed 14 and 15, which act as an oil-pressure controlled suspension and as a lifting unit in order to be able to position vertically the movement assemblies 11 and 12 or compensate for the inclinations of the ground in order to be able to perform movements always with the center of gravity at right angles to the ground.

The oscillating supports 16 and 17 are each constituted by a bracket; the oscillating supports 16 and 17 are coupled to the transverse rocker 13 by means of a longitudinal pivot 50, the axis Z of which is perpendicular to the axis Y of the hubs of the rocker 13 and to the rotation axis X of the rotary distribution unit 19 described hereinafter.

The load-bearing frame 18 is mounted on the oil-pressure controlled cylinders 14 and 15 and only on them.

The load-bearing frame 18, in the present exemplary embodiment, which is obviously non-limiting for the disclosure, has an H-like plan shape which is formed by a central body 54 and by two opposite side walls 55 and 56.

The central body is provided with a seat 51 for fixing the first part 20 of the rotary distribution unit 19 and there are, between the side walls, two opposite recesses 52 and 53 in which the body of the oil-pressure controlled cylinders 14 and 15 is fixed.

The oil-pressure controlled circuit adapted to serve the ground movement assemblies 11, 12 and the suspension means 14, 15 is constituted by a series of connected holes provided in the central body 54 and in the side walls 55 and 56 of the load-bearing frame 18; in this manner there are no external tubes for the transfer of the oil to the various user devices.

Figure 7:
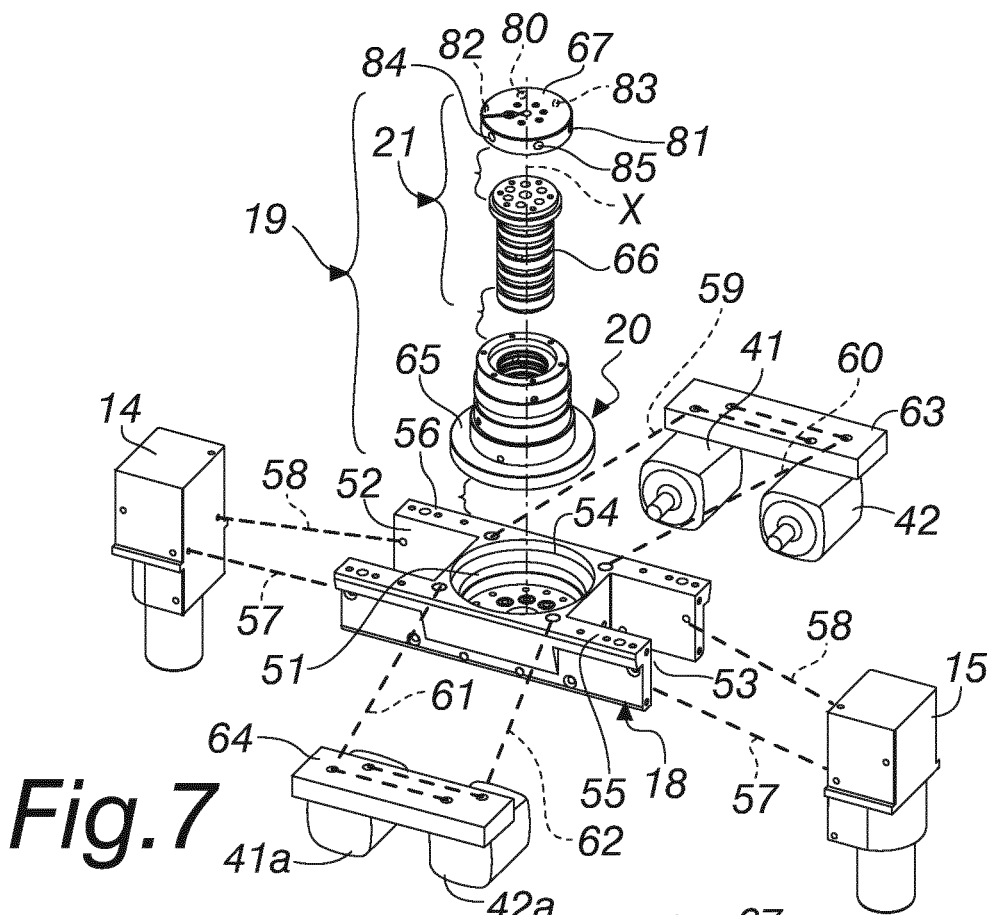
FIG. 7 is an exploded perspective view of the hydraulic circuit of the self-propelled module according to the disclosure.

FIG. 7 shows schematically the oil-pressure controlled circuit of the load-bearing frame 18.

The following ducts for connection to the rotary distribution unit 19 are provided in the load-bearing duct 18:

outgoing and return ducts 57 and 58 for the oil toward the oil-pressure controlled cylinders 14 and 15, a duct 59 for connection to a first motor 41 of the first movement assembly 11, a duct 60 for connection to a second motor 42 of the first movement assembly 11, a duct 61 for connection to a first motor 41a of the second movement assembly 12, a duct 62 for connection to a second motor 42a of the second movement assembly 12.

Each pair of motors 41, 42 and 41a and 42a is connected to a corresponding manifold 63 and 64 for the distribution of oil to the connected motors.

The rotary distribution unit 19 comprises, as mentioned, a first part 20 which is fixed to the load-bearing frame 18 and a second part 21 which can rotate freely about the vertical axis X with respect to the first part 20.

The first part 20 is constituted by a tubular body, with a flange 65 for fixing to the bottom of the seat 51 of the load-bearing frame 18.

The second part 19 has a cylindrical central body 66, which is contoured to arrange itself in the central hole of the first part 20, and a connection head 67 which is provided with radial holes for connection to an external oil-pressure controlled service system of the module 10.

A number of annular ducts 68, 69, 70, 71, 72, 73 that matches the number of ducts formed on the load-bearing frame 18 is formed between the first part 20 and the cylindrical central body 66.

Each one of the annular ducts 68, 69, 70, 71, 72, 73 is connected and interposed between a corresponding upper duct, which is provided in the second part 21 and is connected to the external oil-pressure controlled service system of the module 10, and a corresponding lower duct, which is provided in the first part 20.

The upper ducts exit onto the lateral face 74 of the connection head 67, while the lower ducts exit onto the lower face 75 of the first part 20.

Figure 8:
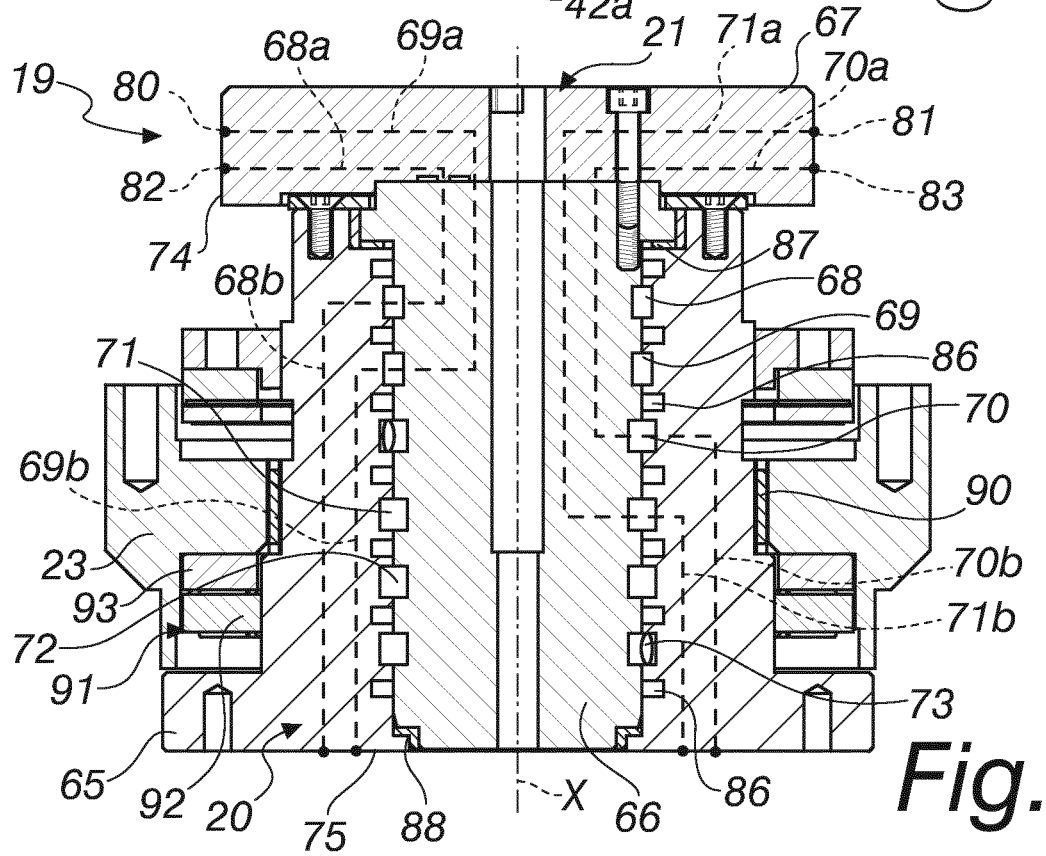
FIG. 8 is a sectional side view of a component of the hydraulic circuit.
Figure 9:
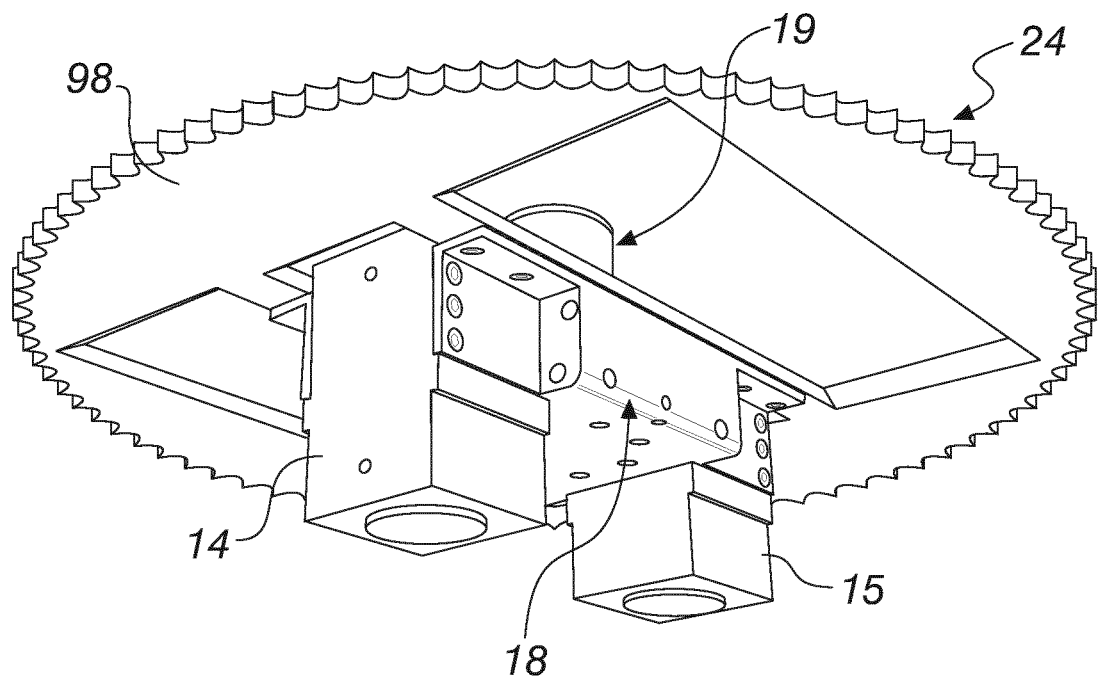
FIG. 9 is a perspective view of a part of the means for relative rotation of the bed with respect to the load-bearing frame.

By way of example, FIG. 8 shows schematically in dashes an upper duct 68a and a lower duct 68b for a first annular duct 68, an upper duct 69a and a lower duct 69b for a second annular duct 69, an upper duct 70a and a lower duct 70b for a third annular duct 70, and an upper duct 71a and a lower duct 71b for a fourth annular duct 71.

Each radial connection hole of the connection head 67 is therefore connected to a corresponding user device by means of the rotary distribution unit 19 and the load-bearing frame 18.

For example, a first radial connection hole 80 is designed for the transit of oil of a first motor 41, a second radial hole 81 is designed for the transit of oil of a second motor 42, a third radial hole 82 is designed for the transit of oil of a third motor 41a, a fourth radial hole 83 is designed for the transit of oil for a fourth motor 42a, a fifth radial hole 84 is designed for the transit of oil for the lifting of the oil-pressure controlled cylinders 14 and 15, a sixth radial hole 85 is designed for the transit of oil for the lowering of the oil-pressure controlled cylinders 14 and 15.

Annular slots 86 for corresponding sealing rings are formed between two consecutive annular ducts 68, 69, 70, 71, 72, 73 and above the first duct and below the last duct.

The cylindrical central body 66 of the second part 21 rests on two shoulders of the first part 20 by interposition of friction reduction rings 87 and 88.

The connection head 67 is fixed to the cylindrical central body 66 and rests on the first part 20 by means of a friction reduction ring 89, which is contoured also to prevent the extraction of the cylindrical central body 66 from its seat in the tubular body of the first part 20.

The center bearing 23 is arranged so as to surround the first part 20 of the rotary distribution unit 19 and is supported by the first part 20, as clearly visible in FIG. 8.

The center bearing 23 is free to rotate with respect to the first part 20 by interposition of a centering bearing with axial rollers 90 and by resting on a bearing with radial rollers 91, a first lower annular element 92 of which is fixed to the first part 20 while the second upper annular element of which 93 is fixed to the center bearing 23, which rests on it.

The resting bed 22 is extended transversely so as to cover the movement assemblies 11 and 12 and in an anteroposterior direction so that below there is a technical space for fitting structural reinforcement elements and the relative rotation means 24, as described better hereinafter.

Figure 10:
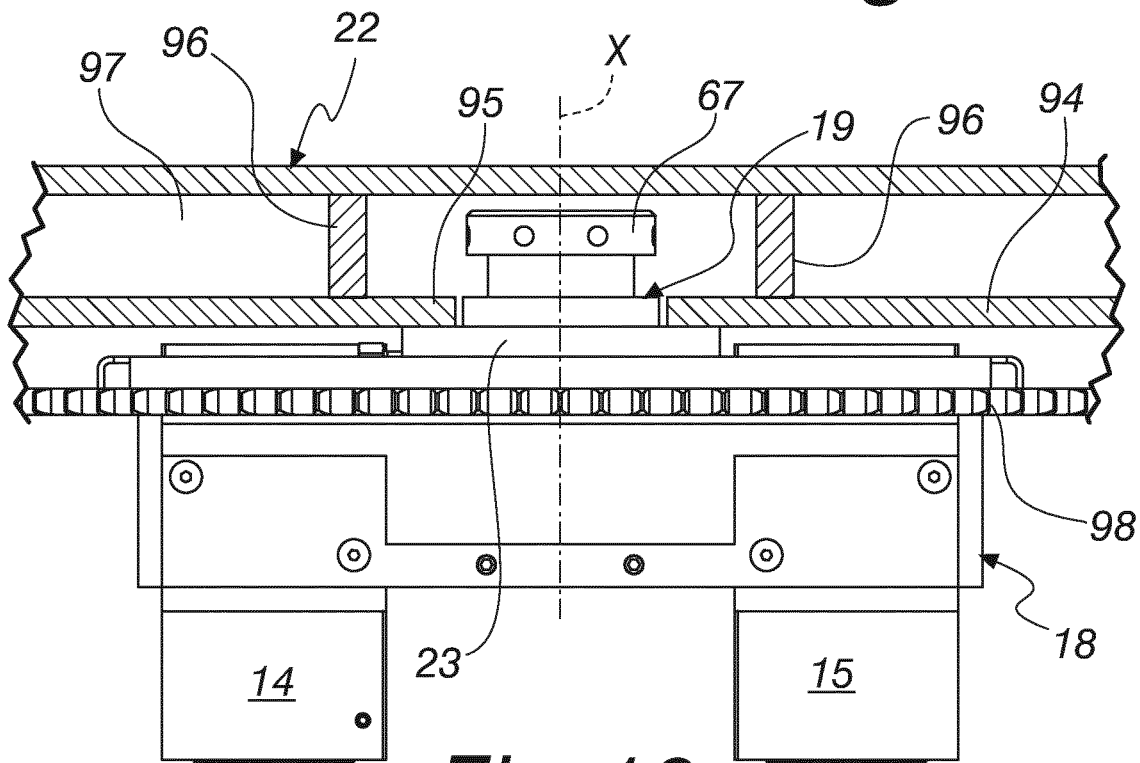
FIG. 10 is a schematic sectional side view of the bed on the load-bearing frame.
Figure 11:
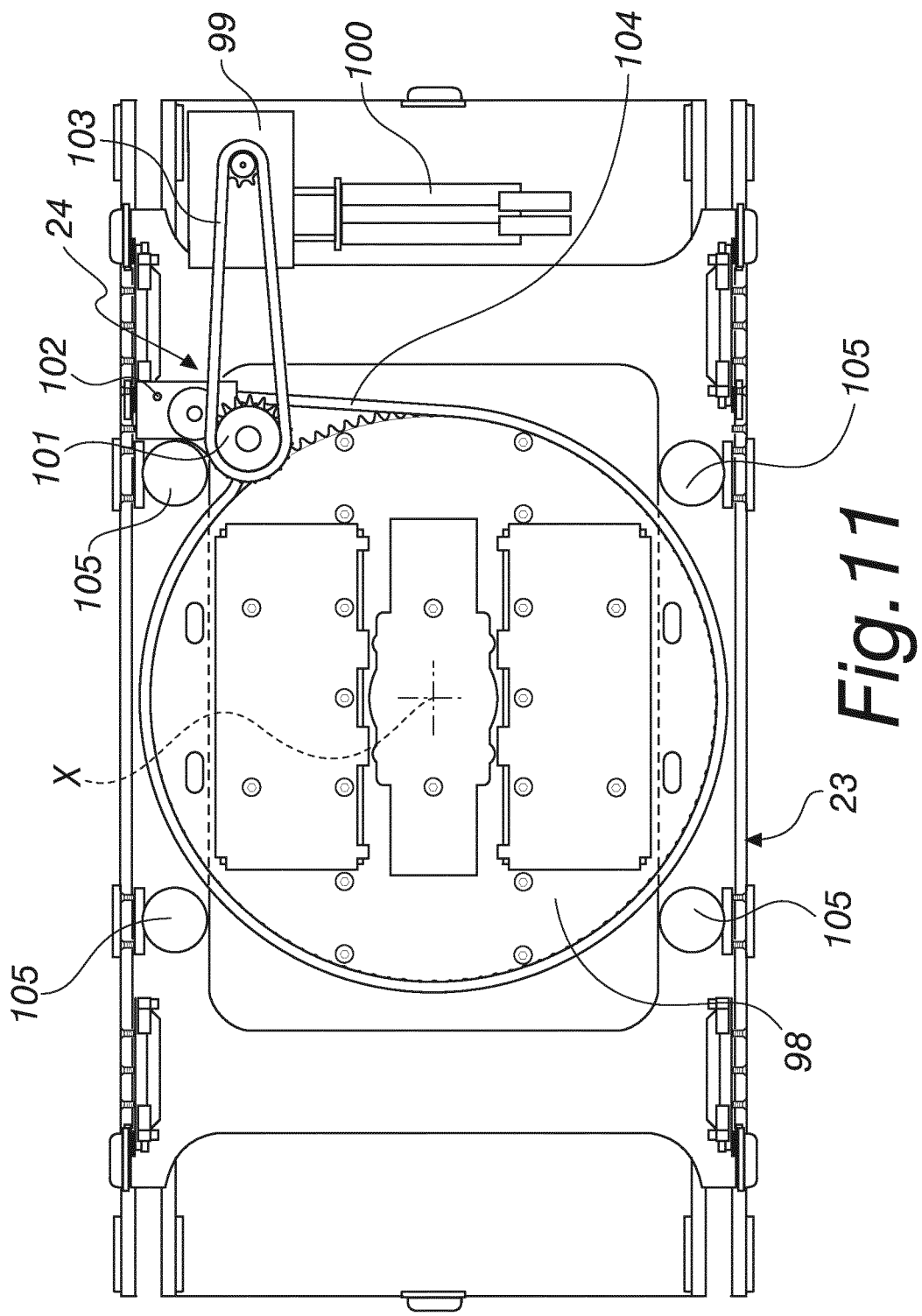
FIG. 11 is a schematic plan view of the means for relative rotation of the bed with respect to the load-bearing frame.

The resting bed 22 is fixed to the center bearing 23 by means of a central contrast plate 94, clearly visible in the schematic sectional view of FIG. 10, which is provided centrally with a circular opening the edges 95 of which are fixed to the center bearing 23.

The contrast plate 94 is fixed to the bed 22 by means of stiffening bars 96.

An interspace 97 is formed between the bed 22 and the contrast plate 94 and is adapted to allow the positioning therein of the connection head 67 of the rotary distribution element 19 and the passage of the pipes for connection to the external oil-pressure controlled service system.

The means 24 for relative rotation, with respect to said vertical axis X, of said resting bed 22 with respect to said load-bearing frame 18 comprise, in the constructive example described herein, a steering ring 98 with a rotation axis that coincides with the axis X, fixed to the load-bearing frame 18 and extended so as to lie above the movement assemblies 11 and 12.

The steering ring 98 is turned by means of a gearmotor 99, driven by an electric motor 100, by virtue of the interposition of an intermediate gear 101 that is fitted on a floating tensioning assembly 102.

The rotation is transmitted from the gearmotor 99 to the intermediate gear 101 by means of a first chain 103.

The rotation is transmitted from the intermediate gear 101 to the steering ring 98 by means of a second chain 104 arranged so as to pass also in the floating tensioning assembly 102.

The intermediate gear 101 is obviously constituted by a first upper pinion, which meshes with the first chain 103, and by a second lower pinion, which meshes with the second chain 104.

The electric gearmotor 99 is provided with a positioning encoder which rotates the assembly to a fixed and determined position.

These rotation means 24 allow the load-bearing frame 18 with the movement assemblies 11 and 12 to rotate without any constraint, being able to rotate continuously both in one direction and in the opposite direction, therefore through any angle, even greater than 360°.

The self-propelled module 10 also comprises means for lifting from the ground.

The means for lifting from the ground are constituted for example by four lifting cylinders 105 arranged at the corners of the frame in which the steering ring 98 is inscribed; said cylinders are intended for two purposes:

to lift the load with a step system by means of a stroke of the suspensions 14 and 15 and a stroke of the cylinders, to remove weight from the movement assemblies 11 and 12 when one wishes to steer while stationary in order to avoid spoiling factory flooring.

A self-propelled module 10 according to the disclosure is designed to be connected structurally and hydraulically to at least two other identical self-propelled modules in order to provide a modular system for oversize loads.

An example of a modular system for oversize loads composed of self-propelled modules according to the disclosure is exemplified in FIG. 1 and is generally designated therein by the reference numeral 110.

In this exemplary embodiment, the modular system 110 comprises four self-propelled modules 10, 10a, 10b, 10c, which are coupled structurally by means of longitudinal members 111 and cross-members 112.

The system is preferably composed of three or four assemblies on which the load rests.

In any case it is possible to also use a single self-propelled module as a traction system to be applied for example to a carriage with wheels.

In order to give stability to the system, the three or four modules are mutually connected in order to provide a perpendicular and parallel arrangement thereof and to keep them upright.

Once the load has been rested on the modules, it is the very rigidity of the object that allows movement, the system does not operate like a truck, which has a bed on which the load rests, but behaves like the trucks of a railcar, in which the railcar itself is rigid (it acts as the load) and the trucks with iron wheels that discharge the weight onto the rail are the two resting elements (self-propelled modules 10).

The described system 110 is based on mutually connected modules, but it is to be understood that a modular system with self-propelled modules according to the disclosure can work also without rigid connections when multiple modules are fixed safely and stably to a same object to be transported.

Each self-propelled module 10, 10a, 10b, 10c is connected by means of the hydraulic tubes and cables to a wheeled control unit 115, which is managed by means of an industrial PC 116, which is organized to control the module steering and lifting and lowering variables.

The external service hydraulic system is to be understood as being contained within the wheeled control unit 115.

The electrical system for supplying power to the gearmotor 99 and for the operation of the wheeled control unit 115 is supported by the wheeled control unit 115 itself.

The wheeled control unit 115 is structurally connected to at least one self-propelled module 10c by means of an articulated towing arm 117.

The articulated towing arm 117 also bears the cables and tubes for connection to the self-propelled modules.

The electric motor 100 that manages steering is capable of varying the rotation rate, thus allowing a rotation at different angles but in the same times, which is fundamental for achieving the steering geometry of four self-propelled modules arranged in four different points.

The types of steering with this system are substantially infinite.

A modular system for oversize loads composed of self-propelled modules according to the disclosure is formed:
by at least three self-propelled modules, if a system is used without using its suspension means 14 and 15,
by at least four modules, when one uses two of the four modules connected to each other with a hydraulic tube which connects the chambers of the suspension cylinders 14 and 15 of the two modules; in this case, due to the principle of communicating vessels, three resting points are always defined, two real resting points on the two modules the suspensions of which operate in a hydraulically independent manner and a virtual resting point at the center of the two hydraulically connected modules.

A modular system with self-propelled modules according to the disclosure can be expanded at will to multiples of two modules, which in turn will be connected to others so as to always obtain three suspension points.

A group of hydraulically interconnected modules defines a single suspension point; it is therefore possible to have three groups of "n" modules which form a modular transport system always with three suspension points.

Steering management is electric at low voltage and is controlled by a motor that is managed by a drive with feedback which, by means of the encoder of the electric motor 100 of the gearmotor 99, knows exactly the spatial position of the axis of the self-propelled modules 10.

The industrial computer 116 connected to the system manages the information that arrives from a radio control of the modular system 110.

An operator uses the radio control to steer the self-propelled modules.

Steering can be for example of five types and more precisely:
front steering, of the automotive type;
rear steering, typically of forklift trucks;
opposite steering, like a road roller which pivots at the center of the chassis;
all the modules rotated through a same angle, like a crab,
carousel, i.e., a fixed position so as to rotate about itself.

First of all it is necessary to tell the industrial PC 116 where the modules 10 are located and how they are positioned.

An adapted user interface allows to choose a preset configuration from a set of "n" possibilities depending on the desired number of modules.

Once the configuration has been selected, it is necessary to tell the PC where the modules are in space in order to allow the system to calculate the exact steering angle for each individual module on the basis of its position and of the set radius of curvature.

This calculation is straightforward and is performed by the PC, which sends the order to each respective steering motor to arrange itself exactly with the required angle and to keep it.

In practice it has been found that the disclosure achieves the intended aims and advantages.

In particular, the disclosure has provided a compact self-propelled module the resting surface of which is low, i.e., close to the ground, and at the same time capable of supporting and moving tens of tons of load; a self-propelled module 10 according to the disclosure in fact can be provided with such dimensions that the bed 22 is spaced from the ground by approximately 40 centimeters and the steering ring has a diameter of 1 meter; such a self-propelled module is capable of supporting approximately 40 tons.

Furthermore, the disclosure provides a self-propelled module that is capable of better distributing the weight that is supported on the ground with respect to vehicles of the known type, by virtue of the movement assemblies constituted by tracked shoes as described above.

Moreover, the disclosure has provided a self-propelled module that is capable of a better steering angle than modular systems and vehicles of the known type.

As described above, the disclosure has provided a self-propelled module that can be composed with other identical modules so as to form a modular transportation system that can be adapted to the most disparate requirements of transportation, both in terms of weights and in terms of dimensions of the bodies to be transported.

The disclosure thus conceived is susceptible of numerous modifications and variations; all the details may further be replaced with other technically equivalent elements.

In practice, the components and the materials used, so long as they are compatible with the specific use, as well as the contingent shapes and dimensions, may be any according to the requirements and the state of the art.

The disclosures in Italian Patent Application No. 102016000055947 (UA2016A003959) from which this application claims priority are incorporated herein by reference.

The invention claimed is:

1. A self-propelled module for oversize loads, comprising:
    two ground movement assemblies with oil-pressure controlled actuation,
    a transverse rocker arranged between said movement assemblies, which are coupled thereto independently,
    oil-pressure controlled suspension means, arranged on corresponding oscillating supports coupled to said transverse rocker,
    a load-bearing frame, supported by said oil-pressure controlled suspension means, comprising an oil-pressure controlled circuit adapted to serve said ground movement assemblies and said suspension means,
    a rotary distribution unit, having a vertical axis, mounted on said load-bearing frame for supplying the ground movement assemblies and the oil-pressure controlled suspension means, a first part of said rotary distribution unit being fixed to said load-bearing frame, a second part being free to rotate about the vertical axis with respect to said first part,
    a resting bed, which is supported by a center bearing that is coaxial to said rotary distribution unit,
    below said resting bed there being means for the relative rotation, about said vertical axis, of said resting bed with respect to said load-bearing frame.

2. The self-propelled module according to claim 1, wherein said ground movement assemblies are each constituted by a tracked shoe, which comprises a track constituted by a chain of flat elements for resting on the ground which are arranged side by side and are mutually coupled by means of perforated longitudinal brackets and respective transverse pivots.

3. The self-propelled module according to claim 2, wherein one or more friction reduction devices, or one or more roller bearings, are mounted on said pivots and are adapted to receive by resting contact one or more gliding plates arranged so that each one glides on a row of roller bearings.

4. The self-propelled module according to claim 3, wherein said track is moved by two opposite pinions, which in turn are actuated by corresponding oil-pressure controlled motors mounted on one of said gliding plates.

5. The self-propelled module according to claim 3, wherein said transverse rocker comprises a central body from which two opposite hubs extend which are intended for insertion in corresponding central coaxial holes of the gliding plates.

6. The self-propelled module according to claim 1, wherein said oil-pressure controlled suspension means are constituted by two oil-pressure controlled cylinders.

7. The self-propelled module according to claim 1, wherein said load-bearing frame has an H-like plan shape that is formed by a central body and by two opposite side walls, said central body having a seat for fixing of the first part of the rotary distribution unit, two opposite recesses being formed between the side walls, the body of the oil-pressure controlled cylinders being fixed therein.

8. The self-propelled module according to claim 7, wherein an oil-pressure controlled circuit adapted to serve said ground movement assemblies and said suspension means is constituted by a series of connected holes provided in the central body and in the side walls of the load-bearing frame.

9. The self-propelled module according to claim 7, wherein said first part is constituted by a tubular body, with a flange for fixing to a bottom of the seat of the load-bearing frame.

10. The self-propelled module according to claim 1, wherein the following ducts for connection to the rotary distribution unit are provided in said load-bearing frame:
    outgoing and return ducts for the oil toward the oil-pressure controlled cylinders,
    a duct for connection to a first motor of the first movement assembly,
    a duct for connection to a second motor of the first movement assembly,
    a duct for connection to a first motor of the second movement assembly,
    a duct for connection to a second motor of the second movement assembly.

11. The self-propelled module according to claim 1, wherein said second part has a cylindrical central body, which is contoured to arrange itself in a central hole of the first part, and a connection head that is provided with radial holes for connection to an external service hydraulic system of the module.

12. The self-propelled module according to claim 11, wherein between the first part and the cylindrical central body there are as many annular ducts as there are ducts formed on the load-bearing frame, each one of said annular ducts being connected and interposed between:
    a corresponding upper duct, which is provided in the second part and is connected to the external service hydraulic system of the module,
    and a corresponding lower duct provided in the first part.

13. The self-propelled module according to claim 1, wherein said center bearing is arranged so as to surround the first part of the rotary distribution unit and is supported by said first part, said center bearing being free to rotate with respect to the first part by virtue of the interposition of a centering bearing with axial rollers, and resting on a bearing with radial rollers, a first lower annular element of which is fixed to said first part while a second upper annular element is fixed to the center bearing that rests thereon.

14. The self-propelled module according to claim 1, wherein said resting bed is fixed on the center bearing by means of a central contrast plate, which is provided centrally with a circular opening having edges which are fixed to the center bearing.

15. The self-propelled module according to claim 14, wherein between the resting bed and the central contrast plate there is an interspace that is adapted to allow the placement therein of the connection head of the rotary distribution unit and the passage of the tubes for connection to the external hydraulic service system.

16. The self-propelled module according to claim 1, wherein said means for relative rotation, about said vertical axis, of said resting bed with respect to said load-bearing frame comprise a steering ring with a rotation axis that coincides with the axis, fixed to the load-bearing frame and extended so as to lie above the movement units, said steering ring being turned by means of a gearmotor, which is actuated by an electric motor, by interposition of an intermediate gear mounted on a floating assembly, for tensioning, the rotation being transmitted from the gearmotor to the intermediate gear by means of a first chain, the rotation being transmitted from the intermediate gear to the steering ring by means of a second chain that is arranged to pass also in the floating assembly.

* * * * *